United States Patent
Mikkonen

(10) Patent No.: US 6,587,457 B1
(45) Date of Patent: Jul. 1, 2003

(54) METHOD FOR CONNECTING DATA FLOWS

(75) Inventor: Jouni Mikkonen, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/281,569

(22) Filed: Mar. 30, 1999

(30) Foreign Application Priority Data

Mar. 31, 1998 (FI) .................................................. 980732

(51) Int. Cl.[7] ......................... H04L 12/28; H04L 12/56; H04Q 7/20
(52) U.S. Cl. ....................... 370/356; 370/392; 370/409; 370/420; 455/426; 455/450
(58) Field of Search ............................... 370/244, 246, 370/248, 338, 356, 390, 392, 395, 397, 399, 409, 420; 709/223, 238, 243, 232, 228; 455/433, 466, 445, 560

(56) References Cited

U.S. PATENT DOCUMENTS

| | | | |
|---|---|---|---|
| 5,175,758 A | 12/1992 | Levanto et al. ................ 379/57 |
| 5,442,633 A | * 8/1995 | Perkins et al. ............... 370/331 |
| 5,787,341 A | 7/1998 | Parkas et al. .................. 455/90 |
| 5,797,102 A | 8/1998 | Hallikainen et al. .......... 455/557 |
| 5,799,255 A | 8/1998 | Berg et al. .................... 455/551 |
| 5,880,829 A | 3/1999 | Kauhaniemi et al. ........ 356/246 |
| 5,887,254 A | 3/1999 | Halonen ...................... 455/419 |
| 5,903,559 A | * 5/1999 | Acharya et al. .............. 370/355 |
| 5,996,021 A | * 11/1999 | Civanlar et al. .............. 709/238 |
| 6,021,263 A | * 2/2000 | Kujoory et al. .............. 709/232 |
| 6,084,855 A | * 7/2000 | Soirinsuo et al. ............ 370/235 |
| 6,128,298 A | * 10/2000 | Wootton et al. .............. 370/392 |
| 6,131,117 A | * 10/2000 | Clark et al. .................. 709/223 |
| 6,205,149 B1 | * 3/2001 | Lemaire et al. .............. 370/401 |
| 6,226,523 B1 | * 5/2001 | Karlsson et al. ............. 455/466 |
| 6,246,670 B1 | * 6/2001 | Karlsson et al. ............. 370/244 |
| 6,330,239 B1 | * 12/2001 | Suzuki ........................ 370/395 |
| 6,385,195 B2 | * 5/2002 | Sicher et al. ................ 370/356 |

FOREIGN PATENT DOCUMENTS

| | | |
|---|---|---|
| EP | 0 577 959 A1 | 1/1994 |
| EP | 0 790 751 A2 | 8/1997 |
| EP | 0 884 873 A2 | 12/1998 |
| FI | 102132 | 10/1998 |
| WO | WO 97/35405 | 10/1997 |
| WO | WO 97/40610 | 10/1997 |
| WO | WO 97/48210 | 12/1997 |
| WO | WO 99/05828 | 2/1999 |
| WO | WO 99/16266 | 4/1999 |
| WO | WO 99/33291 | 7/1999 |
| WO | WO 99/33301 | 7/1999 |
| WO | WO 99/39480 | 8/1999 |

* cited by examiner

Primary Examiner—Huy D. Vu
Assistant Examiner—M. Phan
(74) Attorney, Agent, or Firm—Perman & Green, LLP

(57) ABSTRACT

The invention relates to a method for supporting the quality of service (QoS) in packet data transmission between a wireless terminal (MT), having data communication with a radio access network, and a data network (LN), in which method data transmission between the terminal (MT) and the radio access network (2) is controlled by at least one mobile IP router (5, 5', 5"). Further, in the method data is transmitted in radio flows between the wireless terminal (MT) and the mobile IP router (5, 5', 5"). In the method, a flow label is defined for at least one radio flow and the desired quality of service is defined for the radio flow.

8 Claims, 7 Drawing Sheets

METHOD FOR CONNECTING DATA FLOWS

Figure 1:
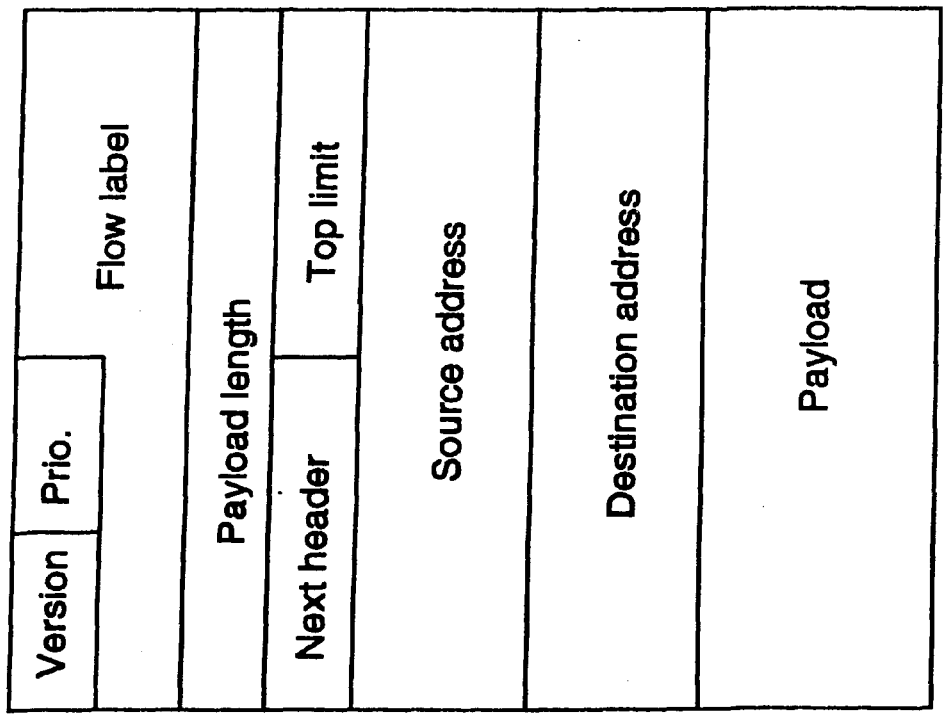

The present invention relates to a method as set forth in the preamble of the appended claim 1 for connecting data flows in wireless communication according to the Internet protocol, a system as set forth in the preamble of the appended claim 6, and an access point as set forth in the preamble of the appended claim 8.

The International Standardisation Organisation ISO has developed an open system interconnection (OSI) model for describing the distribution of data transmission in different layers. The layers are, listed from top downwards, an application layer (layer 7), a presentation layer (layer 6), a session layer (layer 5), a transport layer (layer 4), a network layer (layer 3), a data link layer (layer 2), and a physical layer (layer 1). In view of the present specification, the most essential layers are the physical layer, the data link layer, the network layer, and the application layer.

The term "Internet" is commonly used to describe an information resource from which information can be retrieved from a data processor, such as a personal computer (PC). The data processor communicates via a modem with a telecommunication network. This information resource is distributed world-wide, comprising several storage locations which also communicate with the telecommunication network. The Internet is made operable by defining certain data communication standards and protocols, such as TCP (transmission control protocol), UPD (user datagram protocol), and IP (Internet protocol), which are used for controlling data transmission between numerous parts of the Internet. The TPC and the UDP are involved with preventing and correcting data transmission errors in the data transmitted in the Internet; the IP is involved with data structure and routing. The currently used versions of the Internet protocol are IPv4 and IPv6.

Thanks to the growing popularity of open data systems, the Transmission Control Protocol/Internet Protocol (TCP/IP) communication protocol has become a generally used protocol whereby computers of different sizes and brands can communicate with each other. TCP/IP support is currently available for almost all operating systems. The network layer protocol of TCP/IP, the Internet Protocol IP, is intended to be routed by gateways, i.e. routers. The routing is conducted by means of IP addresses and routing tables.

In the Internet, each device has its own individual IP address. In the Internet protocol version IPv4, the IP address consists of 32 bits, i.e. it is a digit of four bytes which is divided in two parts: an organisation-specific network address and a network-specific device address. In the more recent Internet protocol version IPv6, the length of address fields has been added to 128 bits, which means in practice that an individual address can be reserved for all devices that are connected with the Internet network. FIG. 1 shows in IPv6 the blocks of the data packet in Internet messages.

The header block consists of the following elements:

Version IP version of 4 bits (=6),

Prio. priority of 4 bits,

Flow label 24 bit label for identifying the connection in the application layer, Payload length 16 bit integer indicating the length of the payload, i.e. the length of the packet after the header in bytes, Next header data of 8 bits determining the header immediately following the IPv6 header, Hop limit integer counter of 8 bits which is reduced by one at the each device (node) which transmits the packet further; the packet is rejected if the value is reduced to zero, Source address the 128 bit address of the sender of the original packet, Destination address the 128 bit address of the intended recipient.

The header is followed by the payload block, i.e. the actual information to be transmitted.

Physically, the Internet consists of communication networks arranged in a hierarchy, for example local area networks (LAN), regional telecommunication networks and international telecommunication networks. These communication networks are coupled internally and externally with routers which transmit information from the transmitting terminal equipment or from the preceding router in the chain of data transmission, and route the information to the receiving terminal equipment or to the next router in the chain of data transmission.

Below in this specification, the transmitting terminal equipment and receiving terminal equipment will also be called by the common term Internet host. The Internet hosts can be typically used either as the source host SH and the destination host DH. In the present specification, the Internet hosts connected in a wireless manner with the Internet network are called a wireless terminal.

An Internet host, coupled to the Internet network via a local area network LAN, is either provided with a permanently defined Internet address or the address is a dynamic address generated by the server of the local area network (for example by using a dynamic host configuration protocol DHCP). In case the Internet host is coupled by a modem to a telecommunication network, the telecommunication terminal must ask for an Internet address from an Internet service provider to which the Internet host is registered. This is conducted e.g. according to a point-to-point protocol (PPP) formed above the Internet protocol layer. In both cases, the information to be transmitted in the Internet is routed to the Internet host possibly via several communication networks and routers from a remote host by using a determined Internet address.

The IP defines the transmission of the communication in packets (datagrams). The packet data transmission is one reason for the popularity of the Internet, because it allows transmission in bursts which does not require constant on-line connection and makes it possible that several Internet hosts are coupled in the same telephone connection. When a router receives a packet containing a destination address, the router routes the packet forward, if there is free capacity in the buffer memory of the router and at least one open telephone line. If there is not sufficiently memory space or no open telephone line available at the moment, the packet is rejected and the source host or the preceding router must try retransmission later. In general, the Internet does not support time-critical data transmission, and the method of best effort offered by the Internet protocol is sufficient.

In the transmission of packets according to the Internet protocol, the packets can be transmitted directly to the receiver only when the network elements of the addresses of both the host and the destination are the same. In other cases, the packets are transmitted to a router which takes care of transmitting the packets further, either to the next router or to the destination, if the recipient is in the network of the router. In each router, each packet entering the router is transferred from the data link layer according to the OSI model to the network layer, where the header of the packets is examined, and on the basis of the address data therein, a decision is made where the packet is to be transmitted. For transmission, the packets are transferred back to packets of the data link layer. The packets running the same path constitute a so-called communication stream. Because the Internet protocol has the character of a connectionless protocol, the above-mentioned operations must be conducted for each packet entering the router. If the communication layer is fast, for example in accordance with the asynchronous transfer mode ATM, the processing of the packets takes a significant part of the time used for transmission. Thus, the whole transmission capacity of the transfer line cannot be utilised effectively. For correcting this situation, e.g. Internet Engineering Task Force (IETF) has developed a solution in which an attempt is made to accelerate the routing of communication streams. In this solution, which is called Layer 3/Layer 2 switching (L3/L2 switching) or Multi Protocol Label Switching (MPLS), an attempt is made to switch the communication flows in the router directly on the data link layer, thereby reducing the need for performing time consuming routing on the basis of the address data of the network layer.

In an MPLS switching solution, so-called MPLS domains are formed. When a packet arrives to the router of such an MPLS domain, routing is conducted on the network layer. In this context, a short label of fixed length is added to the packet. Packets provided with such a label can be switched in the router by utilising the routing table of the data link layer, thereby avoiding the routing of the network layer. The label is used as an index in the table which determines the switching to the next router to be carried out in the router. Thus, in the MPLS domain, the routing of the network layer is thus conducted at the stage when the packet comes to the domain and, in a corresponding manner, when the packet leaves the domain. In contrast, it is possible to conduct a faster switching inside the domain in the data link layer. However, this solution requires that in each router of the MPLS domain, also a network layer protocol is implemented at least partially, as well as Internet protocol stack. In the MPLS domain, there are always three routers participating in the switching: the router that has transmitted the packet, the router switching the packet, and the next router receiving the packet. Because the routers are normally permanent, also the switching table can be made permanent and be updated in situations when new routers are added or routers in use are removed.

Telecommunication networks and the Internet are two significant world-wide communication networks, and wireless telecommunication terminals are being developed for coupling therewith and for their use. For example, cellular networks make it possible to couple a wireless telecommunication terminal to a telecommunication network and offer a high quality of service with circuit-switched technology. These cellular networks and other mobile communication networks can be utilised also for coupling to the Internet network and for utilising multimedia services. However, the circuit-switched system has the disadvantage that the connection from a wireless telecommunication terminal to a wireless communication network is turned on during the whole connection, which takes up the capacity of the wireless communication network and limits the number of simultaneous connections.

Data transmission in packet form improves the degree of capacity utilisation of the communication channel in general, not only for retrieving information from the Internet. For example, packet data transmission can be used in applications, such as voice calls, video negotiations and other communications according to different standards. However, some of these applications are time-critical. For example in a real-time voice call, the service of best effort offered by the Internet protocol may cause significant delays in the transmission and transfer of the audio signal, which affects the understanding of the received audio signal so that e.g. speech is almost or totally unintelligible. Moreover, the delay (the time consumed from the transmission to the receipt of the packet) may vary during the transmission of the audio signal, depending on e.g. the load of the communication network and variations in transmission errors. The same applies also to the transmission of a video signal in real time. There may also be situations where the users of the Internet do not want as long delays as occur in many cases for obtaining information from the Internet.

In radio links, data is typically transmitted in a channel which is a certain frequency range. Within one system, several channels can be available simultaneously. Further, in full duplex data transmission, there are separate transmitting and receiving channels, whereby for example a base station transmits on the transmitting channel to the terminal device and the terminal device transmits on the receiving channel to the base station. A problem with radio links is that the radio channel is a limited resource which limits e.g. the band width and/or number of channels that can be reserved as well as the data transmission rate available for the radio link. The radio channel is liable to disturbances, such as distortion of the received signal caused by multi-channel propagation which is due to the fact that the same signal is received at the destination through different routes at different times. To reduce the effect of disturbances, part of the data transmission capacity must be used for transmitting error connection data with the packets, and achieving a desired error probability rate may require several packet retransmissions, which reduces the capacity of the radio link.

In radio links, where several data transmission flows are transmitted on one channel, packets of these different data transmission flows are multiplexed. The transmission order can be affected by arranging packets of different data transmission flows in an order of priority, whereby packets of a flow with higher priority are transmitted more often than packets of a flow with lower priority. These include packets of a real-time application which are preferably made as short as possible. On the other hand, packets of applications with lower priority are often considerably longer than packets with higher priority. Such a long packet prevents the transmission of other packets as long as the transmission of the packet takes, unless a method for determining the quality of service is available also in a wireless connection. This may cause considerable delays also in the transmission of packets with higher priority, and reduce the quality of service.

Problems are caused in wireless communication also by mobility of the wireless terminal device, wherein as the connection of the terminal device changes to another base station, also the Internet connection has to be connected via this base station. Thus, also the routing may have to be changed.

It is an aim of the present invention to provide a method for connecting a radio flow and a flow according to the Internet protocol in a wireless Internet connection. The method of the invention is primarily characterised in what will be presented in the characterising portion of the appended claim 1. The system of the invention is primarily characterised in what will be presented in the characterising portion of the appended claim 8. Further, the access point of the invention is primarily characterised in what will be presented in the characterising portion of the appended claim 12. The invention is based on the idea that a label is added to the packets of the data link layer in order to define which packets of the IP flow and radio flow belong to the same data flow.

The present invention gives significant advantages to the methods and systems of prior art. By providing, in accordance with the invention, IP packets with a label, it is possible e.g. to implement the access point in a more simple manner, because implementation in the network layer level is thus not required at the access point, but a structure according to the data link layer and the physical layer added with the interlayer of the invention is sufficient therein. Thus, also the transmission of packets is accelerated, because time-consuming routing in the network layer can be avoided at the access point.

Figure 2:
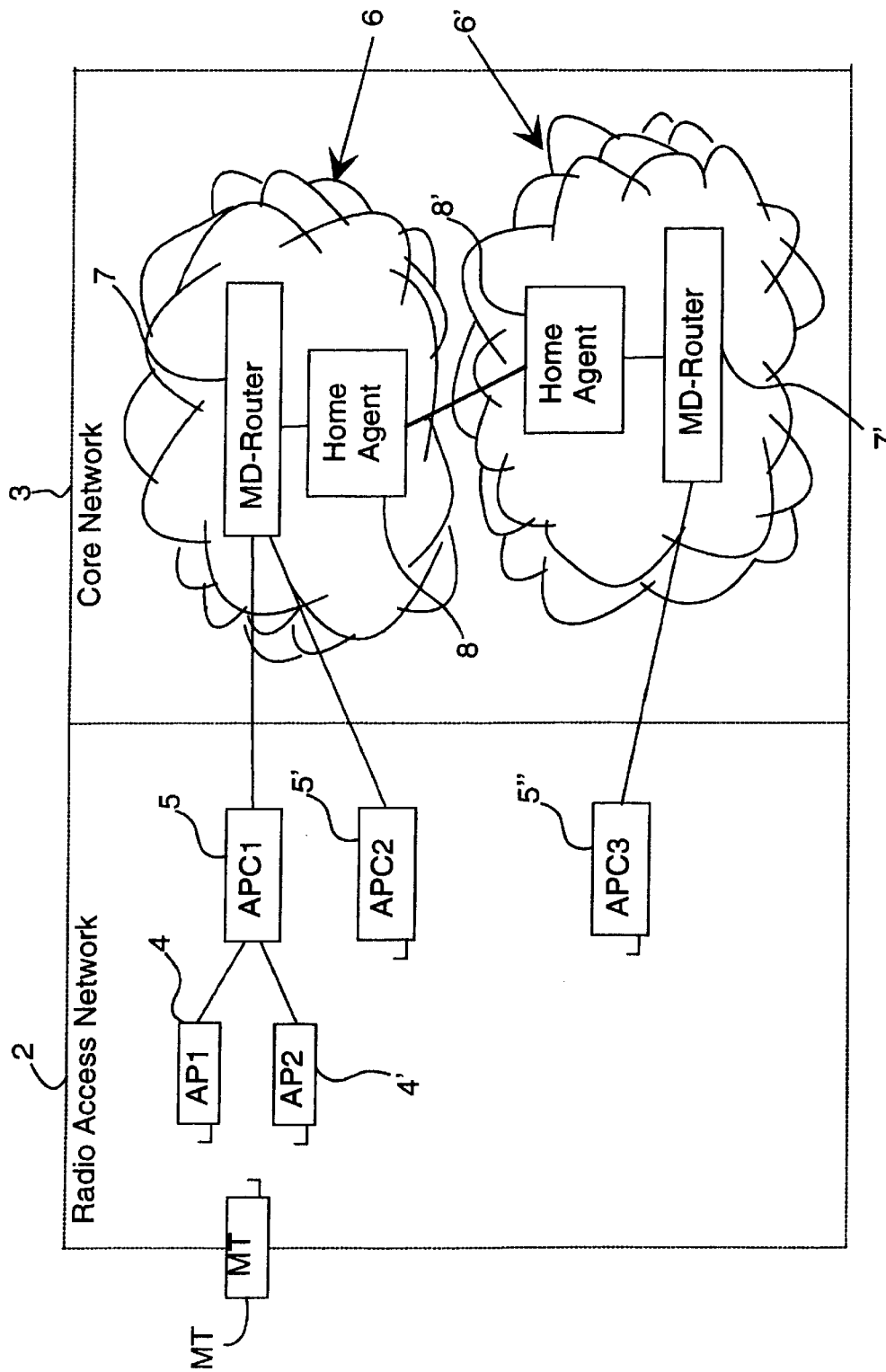
Figure 3:
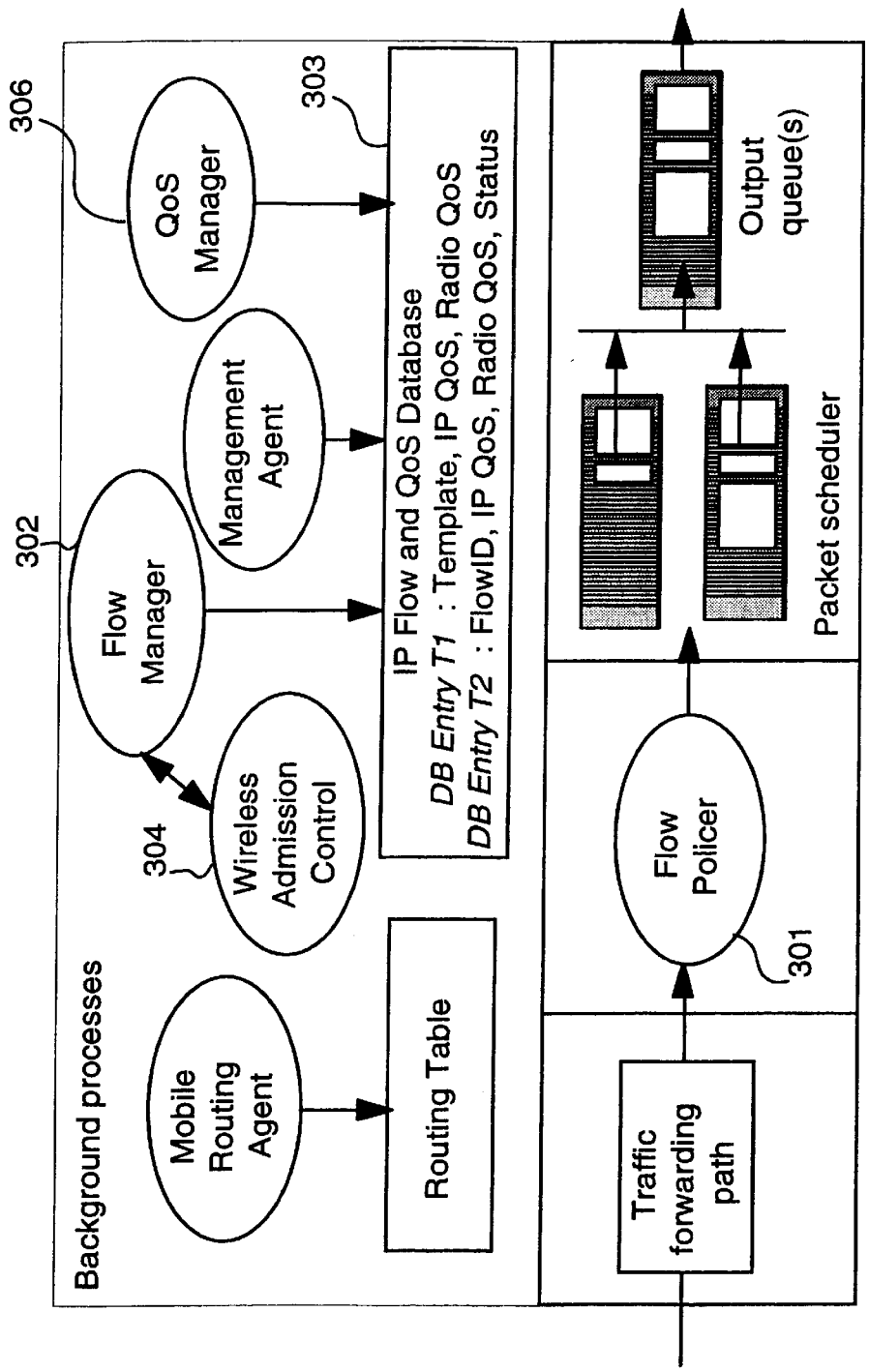
Figure 4A:
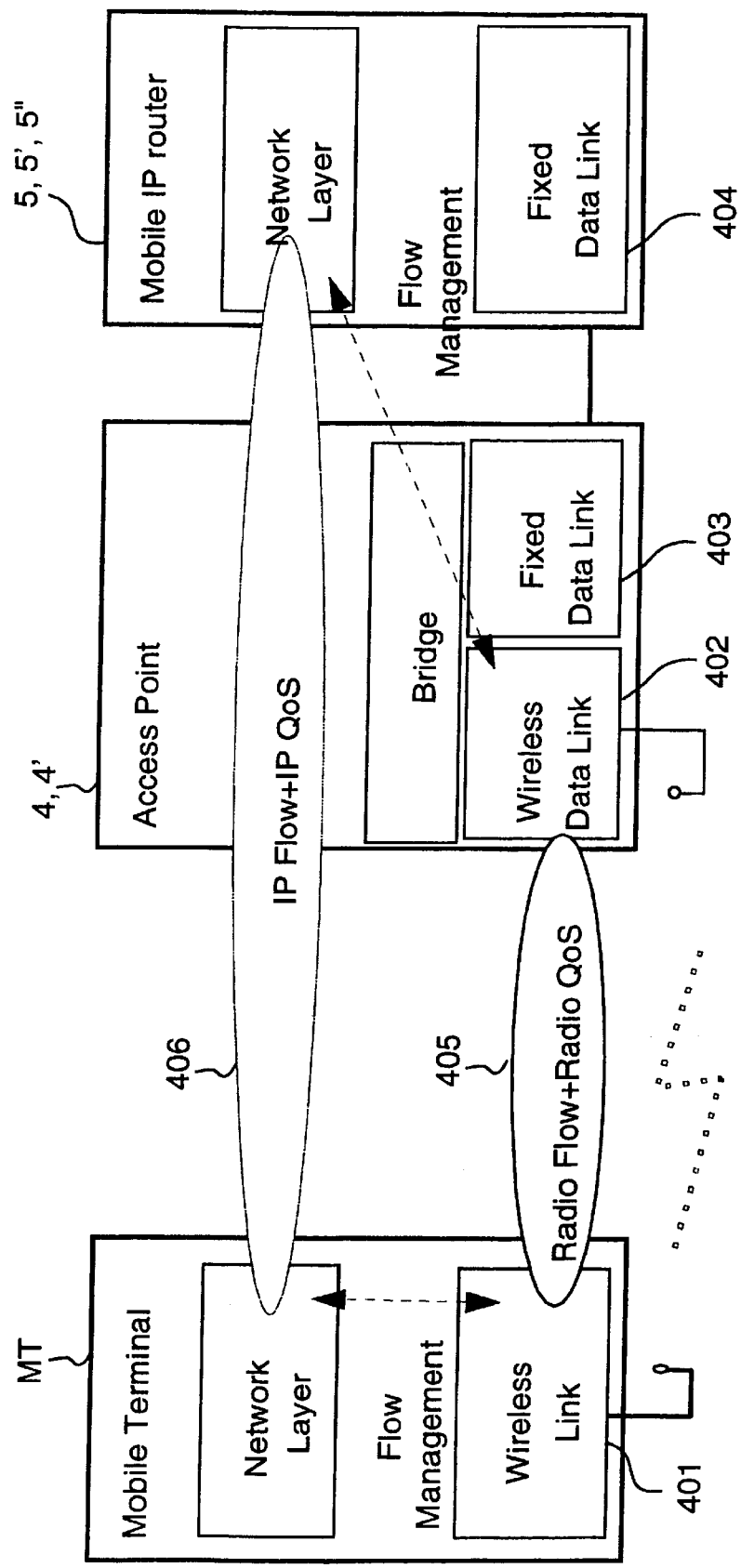
Figure 4B:
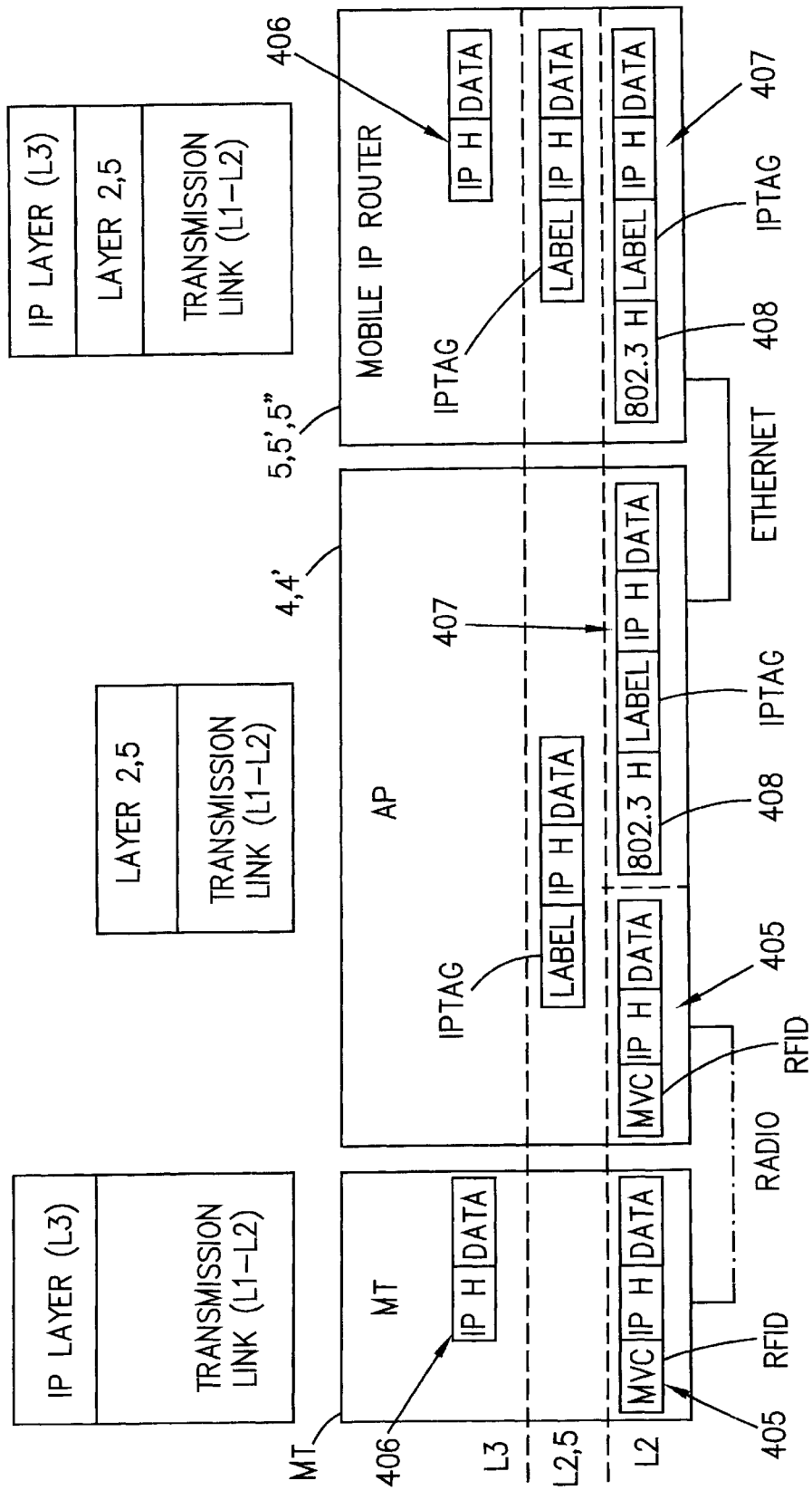
Figure 5:
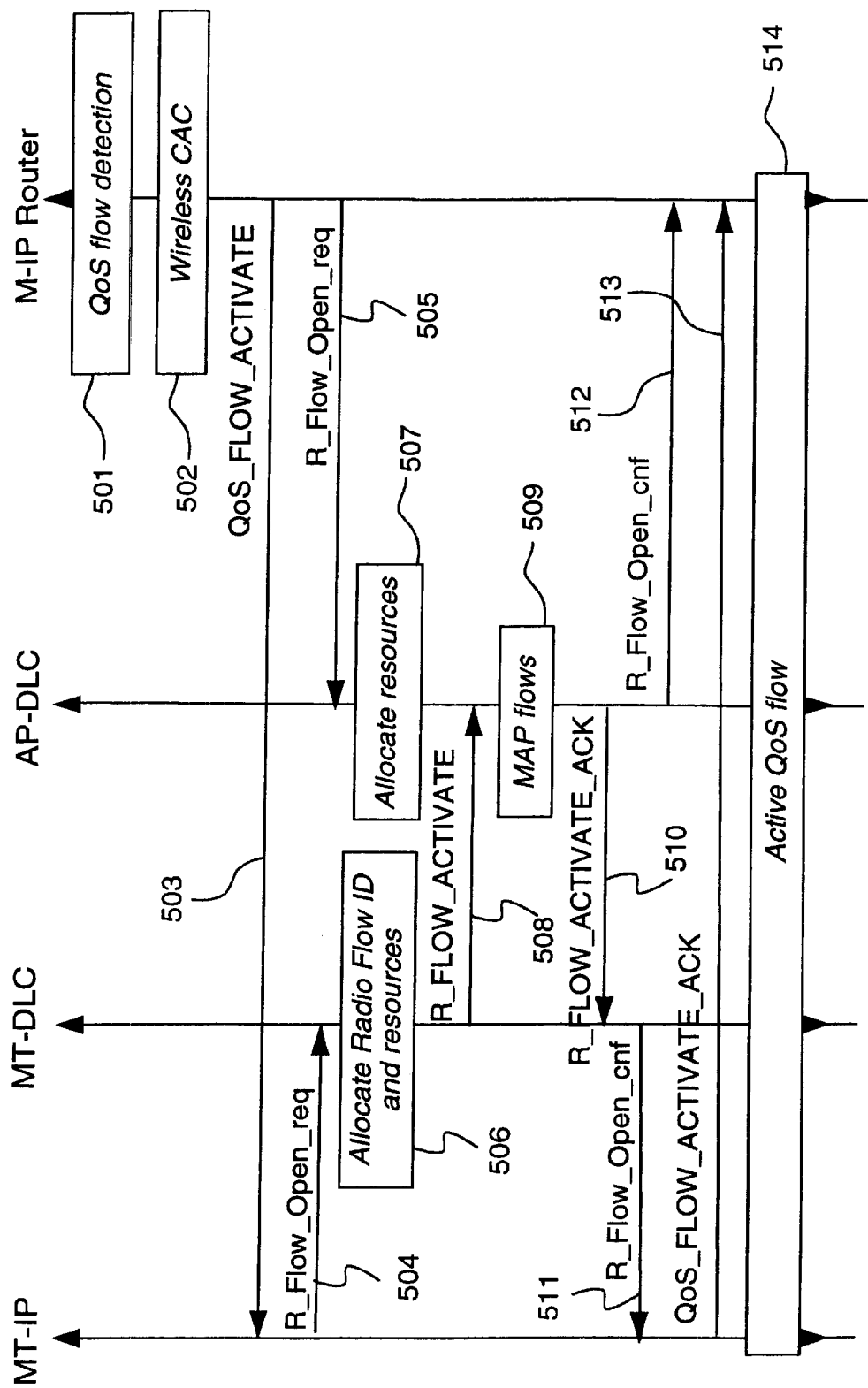
Figure 6:
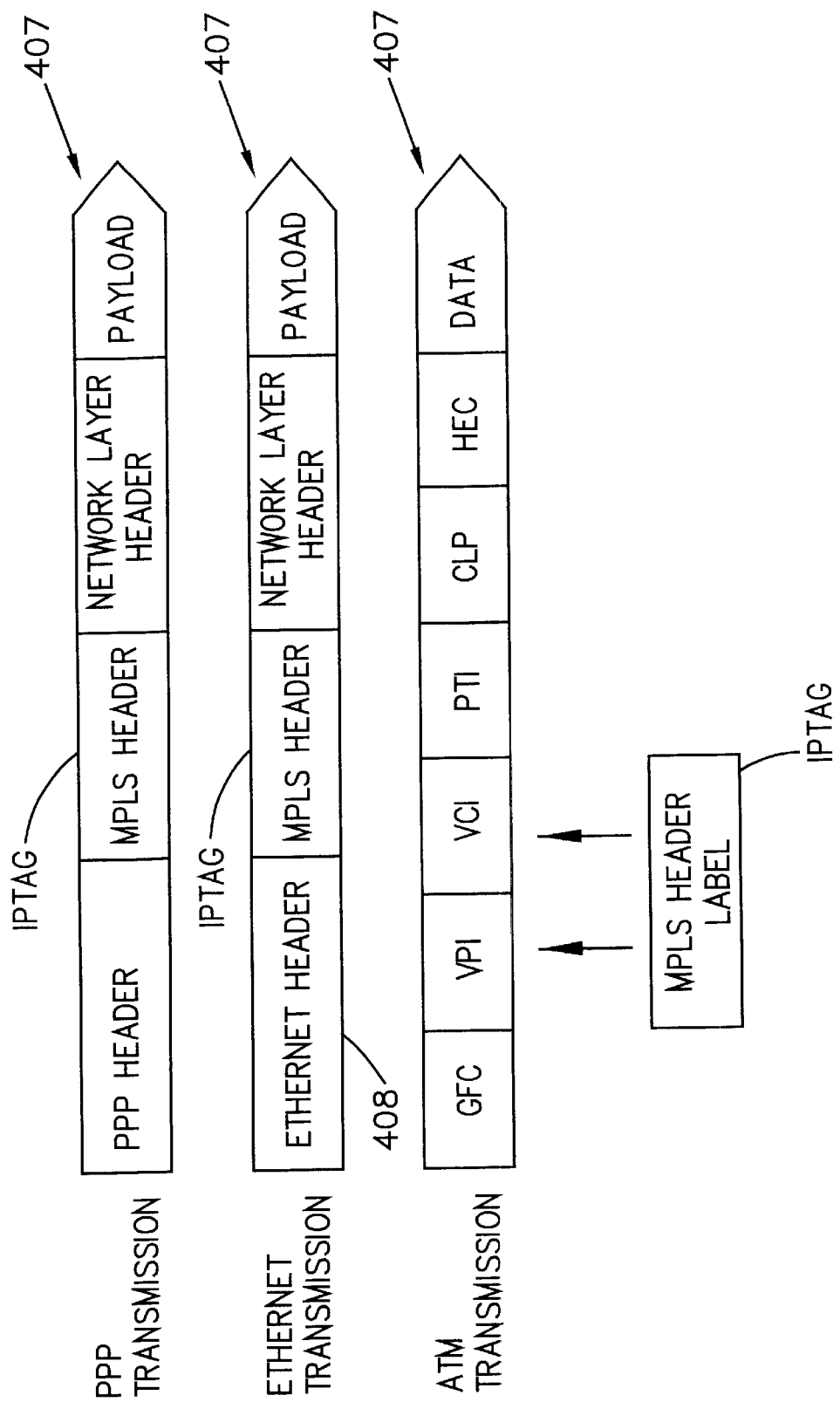

In the following, the invention will be described in more detail with reference to the appended drawings, in which FIG. 1 shows the structure of the packet of the Internet protocol version IPv6, FIG. 2 shows the coupling of a wireless Internet host to the Internet network in a reduced chart, FIG. 3 shows the functional blocks of the identification of IP flow and the definition of quality of service standard in a principle chart, FIG. 4a shows the propagation of and correlation between the IP flows and radio flows in the protocol layer in one system according to a preferred embodiment of the invention in a principle chart, FIG. 4b shows packets of different phases in one system according to a preferred embodiment of the invention in a principle chart, FIG. 5 shows an example of creating a radio flow label when detecting a data flow in a wireless communication network, and FIG. 6 shows examples for placing the IP flow label in packets of different data transmission protocols.

In the following, the invention will be described by using the GSM cellular network as an example of a wireless communication network and a wireless communication device of the GSM system as the wireless Internet host, but the invention can also be applied in other wireless communication networks and wireless telecommunication terminals with the option for data transmission in packets. Such a wireless terminal MT can also consist of a computer, such as a portable computer, coupled with a wireless data transmission device, such as a radio modem.

FIG. 2 is a reduced chart showing the coupling of a wireless Internet host in the Internet network. The system consists of a wireless terminal MT, a radio access network 2 and a core network 3. The radio access network comprises the operations for accomplishing data transmission between the wireless terminal MT and the core network 3 as well as for controlling wireless resources, for setting up and down wireless data flows or radio flows, for moving the connection from one control station to another (handover), and possibly also for compressing packets e.g. according to the IPv6 standard. In this example, the functional elements of the radio access network include an access point 4, 4' (AP) and a mobile IP router 5 (Access Point Controller, APC). A radio communication is set up between the access point 4 and the wireless terminal MT, for transmitting e.g. signals required for setting up the connection and information during the connection, such as data packets of an Internet application. The mobile IP router 5 controls over one or several access points 4, 4' and connections set up through them to wireless terminals MT. The radio access network 2 may comprise several mobile IP routers 5, 5', 5". In the GSM cellular network, the access point 4, 4' is a base station and the mobile IP router 5, 5', 5" a base station controller.

The core network consists of nodes connected by wires in the Internet, such as routers and wired Internet hosts.

The core network can be divided into so-called domains. These domains have a server computer or a corresponding router, by means of which the domain can communicate with other domains in the Internet. The Internet hosts in the domain, in turn, are coupled with the router of the domain. FIG. 2 shows a core network with two such domains 6, 6' which are intended for serving wireless terminals MT. These domains 6, 6' include mobile domain (MD) routers 7, 7' which control the mobile IP routers 5, 5', 5" coupled with the domain 6, 6'. Mobility is achieved in Internet protocol version 6 by supplementing the protocol with a data transmission method whereby the domains can transmit information from a wireless Internet host that has changed its domain. This data transmission method is called in this specification a home agent. In this context, reference is made to the Internet protocol standard version IPv6, where operation of this home agent is described in more detail. The mobile domain router 7, 7' contains the functional properties of the dynamic host configuration protocol version 6 DHCPv6 and the monitoring of the mobility of the wireless terminal MT between the mobile IP routers 5, 5', 5" coupled within the mobile domain 6, 6'. It should be mentioned that in some domains, there may be one or several conventional routers between the mobile domain router 7, 7" and the mobile IP router 5, 5', 5", even though these possible routers are not shown in the appended FIG. 2. In the GSM cellular network, where the general packet radio service GPRS is used, the element corresponding to the mobile domain router 7, 7' is the serving GPRS support node SGSN. The element corresponding to the home agent in said GSM cellular network is the gateway GPRS support node GGSN.

In this specification, data flow refers to the transmission of data packets belonging to the same communication/application. Respectively, wireless data flow refers to the wireless transmission of data packets belonging to the same communication/application, advantageously via the radio channel, whereby also the term radio flow is used. The packets may be e.g. packets complying with the Internet Protocol or GPRS packets of the GSM cellular network. The GPRS packet transmission system provides the possibility of 14 simultaneous connections in one terminal (wireless communication device) at the data transmission level. At present, the GPRS packet transmission offers the possibility of arranging the packets in four different levels of priority. The block reserved for this priority information in the packet can be modified into a block reserved for the radio flow label. In case there is a need to form at least as many radio flows as the number of simultaneous connections, the corresponding number of bits are reserved for the radio flow label. Thus, two additional bits will be needed in addition to the priority block.

IP flow is a data flow of network layer identified by one or more TCP/IP headers (block IP H in data packets of FIG. 4b). Detection of IP flow is conducted by monitoring the data communication of the Internet network and by using an IP flow filter IPVS. The IP flow filter is used for defining the criteria on the basis of which the IP flow (IP) of network layer is detected from the packets of the data flow in the packet network. The IP flow filter can include variable criteria, such as the IP source address, the IP destination address, the TCP source port, the TCP destination port, the protocol block, the type of service, the life time of the packet, etc. The mobile IP router 5 controls network communication and compares the information contained in the data flows with the criteria contained in the IP flow filter in order to detect IP flows. In the Internet protocol version 6, the block corresponding to the type of service is the service grade, and the packet life time block is corresponded to by the router hop limit block.

Correspondingly, a radio flow is a data flow transmitted in a wireless manner. Each radio flow is identified on the basis of the DLC address (data link control address DLC) of the wireless terminal device, the DLC address of access point, and the radio flow label. As the radio flow label, a shorter label is used than in the IP flow filter, because the transfer of a long label consumes the capacity of the radio access network. By using e.g. an eight-bit radio flow label, it is possible to use in one wireless terminal MT simultaneously 256 different flow labels for different Internet applications.

Each connection may be connected with one application, but the same application may involve also more than one connection. The data transmission flows of these different connections belonging to the same application can be identified by the address and port data of the source host and the destination host in the header of the packets.

In prior art systems, the routing of these data flows to a wireless network is conducted by examining the address data in the IP flow in the network layer and, on the basis of this address data, a decision is made as to which wireless terminal MT the packet is transferred. This requires an IP protocol stack and the implementation of the network layer in the access point 4, which complicates the structure of the access point and retards the routing. In the system of the invention, a flow label (IPTAG) is added to the IP flow and a switching table is formed for connecting the IP flow label and the respective radio flow label to each other. In a system according to one preferred embodiment of the invention, this is implemented in a manner that the mobile IP router 5 adds in the network layer this flow label IPTAG to a space reserved for this purpose in the header block of the IP packet coming from the Internet network and fulfilling the criteria of the IP flow filter. Subsequently, the mobile IP router 5 generates a packet according to a corresponding data link layer protocol, where this flow label IPTAG is added. This modified packet is transmitted to the access point 4 where it is received. In the access point 4, the IP flow label IPTAG in this packet according to the data link layer is examined, and a radio flow label corresponding to this IP flow label is retrieved from the switching table, which is stored advantageously in a data base in a memory means of the access point 4. Subsequent to this, a corresponding packet of data link layer is formed according to the corresponding radio flow protocol. This packet is transmitted in a wireless manner to a wireless terminal MT addressed according to the transmission principles of the wireless communication network used at a time. Here in the wireless terminal MT, a radio flow label RFID is examined of the received packet, and the corresponding IP flow filter IPVS is retrieved from the switching table of the radio flow and IP flow stored in the wireless terminal MT, wherein a corresponding IP packet of network layer can be formed.

A wireless communication system based on radio flows comprises a group of predetermined data flows for transmitting control messages and data. Formation of radio flows for transmission of TCP/IP flows comprises e.g. the following phases: identification of IP flows, determining the quality of service corresponding to the IP flow for wireless communication, and signalling for forming a wireless communication.

The mobile IP router 5 has a focal role in the identification of the IP flow and the determination of quality of service for wireless connection. The functional blocks required therein are flow policing, flow management, admission control, network management, quality of service manager (QoS manager), and wireless routing (mobile IP routing). The appended FIG. 3 shows these blocks in a principle chart.

The flow policing block 301 examines data flows e.g. for the detection of IP flows to be routed to a wireless terminal MT. Having detected such a flow, the flow management block 302 uses the information present in the received IP flow for detecting the parameters of quality of service for said IP flow and the radio flow to be formed. This can be implemented by searching in a quality of service data base (block 303, in FIG. 3) the data record (DB entry T1) that corresponds best to the information. The data records stored in the data base contain information from different data flows and the quality of service determinations of the IP flow corresponding to them, as well as the quality of service determinations of the corresponding radio flow in the wireless system to which the wireless terminal MT belongs. As known, various factors in radio flows compared with wireline IP flows affect at least partially the quality of service. After finding a data record matching best to the examined IP flow, the quality of service determinations of this data record are used for the radio flow that is formed. Subsequently, formation of a wireless connection is started. This formation block of wireless connection is designated in FIG. 3 by reference numeral 304. A description will be provided below in this specification relating to different phases in forming this connection for obtaining a desired quality level for wireless flow.

Provided that a wireless connection at desired quality of service level is achieved, the quality of service data base 303 (DB Entry T2) is thereafter updated by adding the data of the formed wireless connection and the IP flow corresponding thereto in the data base. The data contains e.g. the IP flow filter IPVS, the IP flow label IPTAG, the quality of service of IP flow (IP Flow QoS), the quality of service of radio flow (Radio Flow QoS), and the status of data flow. The data record further contains a radio flow label RFID corresponding to the IP flow label IPTAG, which is used when transferring packets between the IP flow and the radio flow, as will be described below in this specification.

Properties of the IP flows are determined on the basis of the level of quality of service of the IP service. This information related to the quality of service of the IP service can be determined e.g. by a network operator, wherein the network operator can set the parameters of the wireless network to correspond to the special requirements of the operator. On the other hand, the information on the quality of service of the IP flow can be defined also according to signalling related to the quality of service. For each level of quality of service of IP flow supported in a wireless network, a quality of service manager block 306 is provided in the mobile IP router 5. This quality of service manager block 306 conducts updating of the data base irrespective of the flow policing block 301 and the flow manager block 302. The main task of the quality of service manager block 306 is to form above-mentioned data records in the data base wherein said flow labels and quality of service determinations are set for each IP flow. In practical embodiments, various levels of quality of service can be used for different wireless networks.

When connecting different services in the same physical wireless data link channel in wireless data communication, several factors affecting the quality of service have to be taken into consideration: bandwidth, time delay, multipath propagation, and reliability. Efficiency of the wireless data link channel can be increased by grouping different connections in a suitable manner, e.g. according to the level of quality of service of radio flows required by each connection. In addition, radio flows provide a flexible level determination of quality of service. Different levels of quality of service can be attained by providing different groups with different maximum time delays and by connecting different error correction methods, e.g. by using different error correction codes (FEC, CRC) and using acknowledgement requests (ARQ).

FIG. 4a shows a principle chart on propagation of and correlation between IP flows and radio flows on protocol level, and FIG. 4b illustrates packets in different phases in the mobile IP router 5, the access point 4 and the wireless terminal MT. FIGS. 4a and 4b show a wireless station as the Internet terminal, communicating in a wireless manner with the access point 4. This is illustrated by a data transmission block 401 of the wireless station and a wireless data transmission block 402 of the access point. The access point 4 is connected by a fixed data transmission network, e.g. Ethernet or ATM network, to the mobile IP router 5, for which purpose the access point 4 and the mobile IP router 5 are provided with permanent data transmission blocks 403, 404. A block 405 designated with broken lines illustrates a radio flow of data link layer L2 between the wireless terminal MT and the access point 4. The actual data transmission takes place via the physical layer L1 in a wireless manner, which is known as such. The IP flow, i.e. the flow of network layer L3, is illustrated in a block 406, indicated by broken lines. The protocol used in the data link layer L2 is typically different in a wireless connection than in a landline connection.

The radio flow 405 comprises a radio flow label (RFID) and definitions for the quality of service (Radio QoS). In a corresponding manner, the mobile IP router 5 has upon connection forming selected an IP flow label IPTAG for each IP flow 406. This flow label IPTAG is advantageously an isometric block in the header of the packet. This IP flow label is added advantageously to the beginning of the IP packet of network layer, wherein the rest of the packet remains unaltered. This packet supplemented with IP flow label is generated into a packet 407 of data link layer by framing it with header data 408 of the packet of data link layer. This packet 407 is received at the access point 4 and the IP flow label IPTAG is examined in order to detect the respective radio flow label RFID. These radio flow labels RFID and IP flow labels IPTAG fully correspond to each other, wherein an IP flow can be detected according to the respective radio flow label and vice versa. The access point 4 forms a packet 405 of radio flow, wherein the radio flow label RFID has been added. This packet is received in the wireless terminal MT and modified into a packet of IP flow according to the network layer. In the example illustrated in FIG. 4a, a protocol modification block (bridge) 407 is formed for conducting a protocol modification between the packets of the IP flow and the radio flow.

Since the IP-flow label is, in a way, formed between the network layer L3 and data link layer L2, this intermediate phase can be regarded as a sort of intermediate layer L2,5. Even if this functionality of the intermediate layer L2,5 has to be implemented both in the mobile IP router 5 and in the access point 4, its implementation is still considerably easier than the implementation of the network layer at the access point 4, which entails that by employing an arrangement of the invention the access point 4 can be implemented in a simpler manner than in prior art solutions and, additionally, faster packet transmission is attained between the Internet network and the wireless terminal. It is not necessary to implement the intermediate layer in the wireless terminal MT.

FIG. 6 further illustrates examples of where the IP flow label IPTAG can be advantageously added in different data link protocols. By selecting a suitable constant length for the IP flow label IPTAG, it is possible to apply the same mechanism both in Ethernet data transmission and in ATM data transmission.

The user of a wireless terminal MT can use the Internet network e.g. in a manner that an application program designed for this purpose, such as a browser, is initiated in the wireless terminal MT. The user of the wireless terminal selects in the application program the address of the desired Internet server or Internet terminal to be the destination address. This can be e.g. the address of Internet server of the service provider with whom the user of the wireless terminal has made a contract to use Internet services. As mentioned earlier in the present specification, this Internet address can be given as an octet numeral series, or addresses in text form can be used, wherein the domain name server in the server changes the address from text form to a numeral series according to the Internet protocol.

In the following, data transmission from another Internet terminal to a wireless terminal will be described. The Internet application of the mobile station MT, to which the information is finally transferred, transmits said address in order to define the Internet source host. The data transmission is performed e.g. according to the GPRS standard from the wireless terminal MT to the GSM cellular network. The GSM cellular network changes the packet message to a message complying with the Internet protocol and transmits it to the Internet network. The information formed in the application is transferred to the wireless terminal MT according to the Internet protocol via the Internet network by routing, which is known as such, to the GSM network where the information is changed according to the packet transfer mechanisms of the cellular network, in this case to packets of the GPRS network. The information is transferred further through the mobile IP router 5 to the access point 4 and further to the wireless terminal MT, where the received message is transferred to the application level to be handled by an application.

The following further description relates to one preferred method for constituting a radio flow in the data transmission between a wireless terminal MT and the access point 4, 4'. The application is an Internet application of the wireless terminal MT where information according to the Internet protocol is transmitted to the Internet network. The present specification gives no detailed description of the packet formation between the wireless terminal MT and the mobile communication network, which can vary in different mobile communication networks and is prior art known by person skilled in the art. FIG. 5 is a principal chart illustrating this formation of a radio flow for data transmission between the mobile station MT and the mobile IP router 5. All data transmission is based on packets and routed in accordance with the Internet protocol.

The mobile IP router 5 detects that the data flow which it has received from the Internet network is one that should be provided with a radio flow with a certain quality of service (block 501 in FIG. 5). The mobile IP router 5 examines whether a sufficient supply of resources is available in data transmission between the wireless terminal MT and the access point 4 for obtaining the desired quality of service level for said flow FID (block 502). If a sufficient supply of resources is available, the mobile IP router 5 starts signalling with the wireless terminal MT through the access point 4. The mobile IP router 5 sends a flow activating message QoS_FLOW-ACTIVATE to the wireless terminal MT (arrow 503), where the received message is processed in an Internet protocol interface MT-IP. In the flow activating message e.g. an IP flow filter IPVS is transmitted, on the basis of which the mobile station MT can recognise the IP flows from the received packets in the network layer. Further, the mobile IP router 5 sends a request message for forming a radio flow R_Flow_Open_req to the access point 4 (arrow 505), where the link connection interface AP-DLC of the access point conducts resource allocation for the radio flow (block 507). In this message, the IP flow filter IPVS is advantageously transmitted to the access point 4. In the wireless terminal MT, a request message for generating a radio flow R_Flow_Open-req (arrow 504) is formed in the Internet protocol interface MT-IP on the basis of the flow activating message QoS_FLOW_ACTIVE, said message being transmitted to link connection interface MT-DLC of the wireless terminal. The link connection interface MT-DLC selects a radio flow identification RFID for the radio flow to be formed, as well as the resources required by the flow to ensure the quality of service (block 506). Subsequently, the link connection interface MT-DLC transmits a radio flow activation message R_FLOW_ACTIVATE to the access point 4 (arrow 508). The radio flow activation message includes e.g. the IP flow filter IPVS and the corresponding radio flow identification RFID. The link connection interface AP-DLC of the access point selects the respective IP flow filter IPVS and, for connecting the radio flow label RFID, an IP flow label IPTAG, and stores the IP flow label IPTAG and the radio flow label RFID in a switching table (block 509). After this, the access point 4 transmits an acknowledgement message R_FLOW_ACTIVE_ACK to the link connection interface MT-DLC of the wireless terminal (arrow 510), which communicates this acknowledgement to the Internet protocol interface MT-DLC of the wireless terminal in a flow-open message R_Flow_Open_cnf (arrow 511). Correspondingly, the access point 4 sends to the mobile IP router 5 a flow-open message R_Flow_Open_cnf (arrow 512) including the IP flow label IPTAG, wherein the mobile IP router 5 can add the correct IP flow label IPTAG to the packets of the IP flow. At the end of the radio flow generating phase, the Internet protocol interface of the wireless terminal MT-DLC transmits an acknowledgement of flow activation message QoS_FLOW_ACTIVATE_ACK to the mobile IP router 5 (arrow 513). The activated flow is illustrated by block 514 in FIG. 5.

Also other data flows coming from the Internet network and addressed to the Internet application of the wireless terminal MT can enter the mobile IP router 5. Thus, the mobile IP router 5 detects that a flow label can be defined for these flows, wherein the mobile IP router 5 examines the service level desired for each flow and examines whether there is a sufficient supply of recources available for attaining and maintaining the desired service level. Here, the mobile IP router 5 also takes into account other radio flows active at the time and examines whether the desired service level can be provided to a flow without risking the service level of the active flows. In case the service level can be achieved, each flow to be generated will undergo the above described signalling, with which e.g. a radio flow label is determined for the radio flow.

In case the radio channel lacks a sufficient supply of resources for attaining the desired quality of service, it is possible to continue the radio flow on a lower quality of service, e.g. by a transmission according to the best effort, wherein the Internet terminal that has sent the flow can be informed thereof. If necessary, it is possible to inquire the user whether information is desired to be transferred in spite of the quality or service being lower than desired, or whether the data transmission is to be interrupted.

For defining the quality of service QoS, it is possible to utilise information in the header of the application received in the Internet message. At present, a standard is under development on how these qualities of service could be presented and what they could be. In any case, a message according to the Internet protocol contains, in the header, information about the type of the application, which can be e.g. an audio application, a video application, a data application, or a combination of these. These applications of different types have different requirements. For example, the real-time processing of audio and video applications usually requires that the packets must be transmitted to the destination within a certain response time or otherwise the packets must be rejected. However, in data transmission, for example in the transmission of program files, it is the correctness, not real-time processing, of data transmission that is important. In presently known methods and cellular networks, it is defined at the design state, what is the error probability rate in data transmission, on the basis of which it is possible to select the error correction algorithms and to set e.g. a maximum number of retransmissions. All packet information is transmitted according to the same criteria. If any packet is transmitted incorrectly, it is retransmitted. These retransmissions are conducted either as long as the packet is received correctly or, if a response time is defined for the packet, the packet is rejected if it cannot be received within the prescribed time or the maximum number of retransmissions is exceeded. Since in audio and video applications even a partly incorrectly received information would be sufficient, this retransmission constitutes an unnecessary load on the radio access network. On the other hand, the additional load reduces the radio resources available for other applications and thus interferes also with the quality of service obtained by other applications. For detecting and correcting errors, several methods have been developed which are prior art to an expert in the field, wherein it is rendered unnecessary to discuss them in more detail in this context. Further, it should be mentioned that increasing the error detection and error correction capacity by error detection and correction algorithms will increase the need of data transmission. These conflicting demands set a limit to the criterioin how efficient an algorithm is selected, to prevent an unnecessary delay in data transmission.

For various service levels various requirements can be defined. For example, a poorer error probability requirement can be defined for audio and video packets than for data packets. On the other hand, due to the real-time requirement, a higher priority can be defined for audio and video packets than for data packets. Thus, the data packets are sent at a slower pace if the radio access network is loaded. Further criteria describing the quality of service can include e.g. response time within which the packet has to be received or else it will be rejected. By joining these different criteria, several different quality of service levels are obtained. In definitions of quality of service level, also other criteria can be utilised than those described above.

These quality of service levels and the respective bits in the header that are examined are e.g. tabulated by the mobile IP router 5, wherein, by examining these bits of the header, the mobile IP router 5 fetches a corresponding quality of service level from the table. These quality of service levels comprise, stored in the mobile IP router 5, the data of special requirements for each quality of service level, of which e.g. error probability, priority and response time were mentioned above in this specification.

These definitions for quality of service are transmitted from the mobile IP router 5 to the access point 4, which according to this information e.g. defines the transmission order of the packets to be transmitted. Simultaneously, several Internet applications can be arranged to be transferred by one access point 4. For each of these different applications, preferably a separate queue is formed, in which packets are transferred for transmission. From these packets in different queues, the access point 4 selects the packet that is to be transmitted at a time.

The method of the invention can be used also in other packet data transmission protocols and information networks. Also, in addition to the routings known from the Internet network, the invention can be applied in coupling solutions developed for the Internet networks where the router is used for examining the route between data flows and coupling on the hardware level.

The invention is not limited solely to the embodiments presented above, but it can be modified within the scope of the appended claims.

What is claimed is:

1. A method in packet data transmission between a wireless terminal (MT) and a mobile IP router (5, 5', 5") having data communication with a data network utilising the Internet protocol (IP), in which method a first data communication is formed between the wireless terminal (MT) and an access point (4, 4') and a second data communication between the access point (4, 4') and the mobile IP router (5, 5', 5") for transferring IP flows between the wireless terminal (MT) and the mobile IP router (5, 5', 5"), and which first data communication is a wireless data communication, characterized in that in the method an IP flow filter (IPVS) is defined for at least one IP flow for the identification of the IP flow, a radio flow label (RFID) and an IP flow label (IPTAG) are defined for a wireless flow corresponding to said IP flow, wherein said radio flow label (RFID) is connected to the packets of said first data communication, and said IP flow label (IPTAG) is connected to the packets of said second data communication; and wherein the IP flow label (IPTAG) of the IP flow and the radio flow label (RFID) of the radio flow corresponding thereto is stored at the access point; and the data transmission is divided into at least a network layer (L3), a data link layer (L2) and a physical layer (L1), wherein the IP flow label (IPTAG) is added to the packets of the network layer (L3).

2. A method according to claim 1, characterised in that at the access point (4), data transmission is conducted in the data link layer (L2) and the physical layer (L1).

3. A method according to claim 1, characterised in that the packets of the data link layer (L2) are formed of packets according to the Internet protocol.

4. A method according to claim 1, characterized in that the packets of the radio flow are transferred as GPRS packets in the radio access network (2).

5. A method according to claim 1, characterised in that the IP flow label (IPTAG) is defined in a centralised manner, preferably at the mobile IP router (5, 5', 5").

6. A data transmission system comprising:
at least one wireless terminal (MT);
at least one mobile IP router (5, 5', 5");
an access point (4, 4') for transmitting data as packet data transfer between the wireless terminal (MT) and the mobile IP router (5, 5', 5");
means (401, 402) for forming a first data communication between the wireless terminal (MT) and the access point (4, 4') and means (403, 404) for forming a second data communication between the access point (4, 4') and the mobile IP router (5, 5', 5") for transferring IP flows between said wireless terminal (MT) and said mobile IP router (5, 5', 5");

characterized in that the system further comprises:
means (5, 5', 5") for defining an IP flow filter (IPVS) for at least one IP flow for the identification of the IP flow;
means (MT, 5, 5', 5") for defining a radio flow label (RFID) for the radio flow corresponding to said IP flow;
means (5, 5', 5") for defining an IP flow label (IPTAG) for said IP flow;
means (MT, 4, 4') for connecting a radio flow label (RFID) to the packets of said first data communication;
means (4, 4', 5, 5', 5") for connecting an IP flow label (IPTAG) to the packets of said second data communication;
wherein the access point (4, 4') comprises means (303) for storing the IP flow label of IP flow (IPTAG) and the radio flow label (RFID) of radio flow corresponding thereto; and
means (303) for examining the IP flow label (IPTAG) from the IP flow packets, and means (303) for searching the stored radio flow label (RFID) according to said IP flow label (IPTAG).

7. A system according to claim 6, characterized in that the access point (4, 4') comprises means (303) for examining the radio flow label (RFID) in packets of the wireless flow, and means (303) for searching the stored IP flow label (IPTAG) according to said radio flow label (RFID).

8. An access point (4, 4') comprising means (401, 402) for forming the first data communication between the wireless terminal (MT) and the access point (4, 4') and means (403, 404) for forming the second data communication between the access point (4, 4') and the mobile IP router (5, 5', 5") for transmitting IP flows as a packet data transmission between the wireless terminal (MT) and the mobile IP router (5, 5', 5"), characterised in that the access point (4, 4') further comprises:

means (5, 5', 5") for at least one IP flow for identification of the IP flow for reception of the defined IP flow filter (IPVS), means (MT, 5, 5', 5") for the reception of the radio flow label (RFID) defined for the radio flow corresponding to said IP flow, means (5, 5, 5") for defining an IP flow label (IPTAG) for said IP flow, and means (4, 4', 5, 5', 5") for connecting an IP flow label (IPTAG) to the packets of said second data communication, and wherein the access point (4, 4') further comprises means (303) for storing the IP flow label of IP flow (IPTAG) and the radio flow label (RFID) of radio flow corresponding thereto, and means (303) for examining the IP flow label (IPTAG) from the IP flow packets, and means (303) for searching the stored radio flow label (RFID) according to said IP flow label (IPTAG).

* * * * *